United States Patent [19]

Hamahata

[11] Patent Number: 5,402,286
[45] Date of Patent: Mar. 28, 1995

[54] DEVICE FOR MANIPULATING A SHUTTER

[75] Inventor: Hiroshi Hamahata, Daito, Japan

[73] Assignee: Funai Electric Co., Ltd., Daito, Japan

[21] Appl. No.: 962,810

[22] Filed: Sep. 24, 1992

[30] Foreign Application Priority Data

Feb. 27, 1991 [JP] Japan .................. 3-009701 U
Dec. 10, 1991 [JP] Japan .................. 3-349960

[51] Int. Cl.6 .................. G11B 15/675; G11B 33/02
[52] U.S. Cl. .................. 360/96.5
[58] Field of Search .......... 360/85, 96.5, 99.02, 360/99.03, 99.06, 99.07, 132; 369/75.2, 77.1, 75.1

[56] References Cited

U.S. PATENT DOCUMENTS

| 4,641,298 | 2/1987 | Ikedo et al. | 369/77.1 |
| 5,021,904 | 6/1991 | Shimizu et al. | 360/96.5 |
| 5,032,939 | 7/1991 | Mihara et al. | 360/96.5 |
| 5,196,972 | 3/1993 | Matsumaru et al. | 360/96.5 |
| 5,220,552 | 6/1993 | Yokoi et al. | 369/77.1 |

FOREIGN PATENT DOCUMENTS

| 10180273 | 5/1986 | European Pat. Off. . |
| 10307917 | 3/1989 | European Pat. Off. . |
| 0002184 | 1/1988 | Japan . |
| 0142561 | 6/1988 | Japan . |
| 0214955 | 9/1988 | Japan . |
| 31362 | 2/1990 | Japan .................. 360/96.5 |

OTHER PUBLICATIONS (Soviet Invention Illustrated, El Section, week 8725, Aug. 5, 1987 (Derwent Publications Lts., London T03 SU A 1 2 6 7 4 7 4 PONO (Soviet Invention Illustrated, El section, week 8633, Sep. 24, 1986, (London, T 03 SU, A, 1 203 587 (BELO).

Primary Examiner—A. J. Heinz
Assistant Examiner—George J. Letscher
Attorney, Agent, or Firm—Lackenbach Siegel Marzullo Aronson & Greenspan

[57] ABSTRACT

A device for manipulating a shutter adapted to cover an opening through which a tape cassette or disc cassette is inserted in an electronic device or removed therefrom, which includes a chassis containing a tape or disc cassette deck. A front panel detachably secured to the front face of the chassis with a shutter is disposed at an opening which is formed at the front panel in order to put in or take out a tape or disc cassette from the cassette deck. The shutter is hinged to the inner side of the front panel so as to releaseably cover the opening, and means are provided for manipulating the shutter to the released condition under which the tape or disc cassette from the cassette deck can be taken out through the opening. The device comprising manipulating means in the form of a biased swinging lever having a base end pivotally supported at a side of the chassis and having a free end with a guide pin engageable with an extension or stump formed at one side of the shutter, and the stump has a deflector with a guide surface disposed at the rear side thereof, and the swinging lever is deflectable or flexible so as to cause the guide pin to be directed sideways away from the stump by the guide surface provided on the deflector.

5 Claims, 9 Drawing Sheets

DEVICE FOR MANIPULATING A SHUTTER

THE BACKGROUND OF THE INVENTION

The present invention relates to a device for manipulating a shutter for a cassette recorder such as a video tape or disc recorder, a video tape or disc player for home or business use as well as a combination recorder with a television, and other visual or audio devices having a recorder or player.

The prior recorder or player had generally included, as shown in FIGS. 1 and 2, a tape or disc cassette deck 1 disposed in a chassis 2 in the front place thereof, a front panel 3 detachably secured to the front face of the chassis 2 by means of threaded screws 4, a shutter 5 disposed in an opening 6 which is formed to the front panel 3 in order to put in or take out a tape or disc cassette (not shown in the drawing) therethrough toward or from the cassette deck 1, the shutter 5 being pivoted by hinges (not shown in the drawing) mounted on the inner side of the front panel 3 so as to releaseably cover the opening 6, and means for manipulating the shutter 5 to the released condition under which the tape or disc cassette from the cassette deck 1 can be taken out through the opening 6.

The manipulating means included a swinging lever 7 with a pivot shaft 7A rotatably supported by a bearing disposed an assembly, which is mounted on the an inner place in the chassis 2 and includes the cassette deck 1, having a guide pin 7B which is engageable with a stump 5A formed to the side of the shutter 5 with its positioning to the front side of the stump.

The manipulating means can be used such that the swinging lever 7 is automatically turned with its guide pin 7B pushing the stump 5A in the inner direction of the chassis so as to release the shutter 5 from the opening 6, when the tape or disc cassette is taken out through the opening.

However, under the assembling operation of the recorder, the manipulating means adapted to the shutter 5 had one very undesirable problem that the front panel 3 should be secured to the front face of the chassis 2 by means of the threaded screws 4, after the shutter 5 is previously pushed to the inside of the chassis 2 by means of a pusher (not shown in the drawing) which is inserted through the opening 6 automatically or by the operator's hands so as to cause the guide pin 7B to be settled to the front side of the stump 5A after the front panel 3 is assembled to the chassis 2.

Furthermore, the swinging level 7 should be biased by means of a spring member 8 as shown in FIGS. 7 and 8 so as to allow the shutter 5 to shut the opening 6 in its closed position. But the bias spring member may increase the costs and complicate the assembling operations in the manufacture of the tape or disc recorder.

OBJECTS OF THE INVENTION

An object of this invention provides an improved device for manipulating a shutter as to cause a front panel to be assembled to a chassis with ease, without the need for releasing the shutter by such means as a pusher.

A second object of this invention is to provide an improved device for manipulating a shutter, in which a swinging lever is provided in order to guide the shutter to its open position, so as to remove a bias spring member for returning the swinging lever to allow the shutter to be directed to its closed position, and wherein the spring portion is integrally formed with the swinging lever rather than being formed as a bias spring member.

SUMMARY OF THE INVENTION

According to the present invention, there is provided a device for manipulating a shutter which includes a chassis containing a tape or disc cassette deck, a front panel detachably secured to the front face of the chassis, a shutter disposed in an opening which is formed in the front panel in order to put in or take out a tape or disc cassette therethrough toward or from the cassette deck, the shutter being hinged to the inner side of the front panel so as to releaseably cover the opening, and means for manipulating the shutter to a released condition under which the tape or disc cassette from the cassette deck can be taken out through the opening, characterized in that the manipulating means includes a swinging lever having its base end pivotally supported to the side of the chassis and its free end to which a guide pin is formed so as to be engaged to a stump formed to the side of the shutter, the stump having a deflector disposed to the rear side thereof, and the swinging lever being deflectable or flexible to cause the guide pin to be directed to the outside by the side of the stump by the guide of the deflector.

Other features and advantages of the present invention will be apparent from the following description taken with reference to the accompanying drawings.

DETAILED DESCRIPTION

The invention is adapted for manipulating a shutter attached to a front panel for covering an opening formed in the front panel as a cassette inlet and outlet through which a tape or disc cassette is put in a recorder or taken out.

Figure 1:
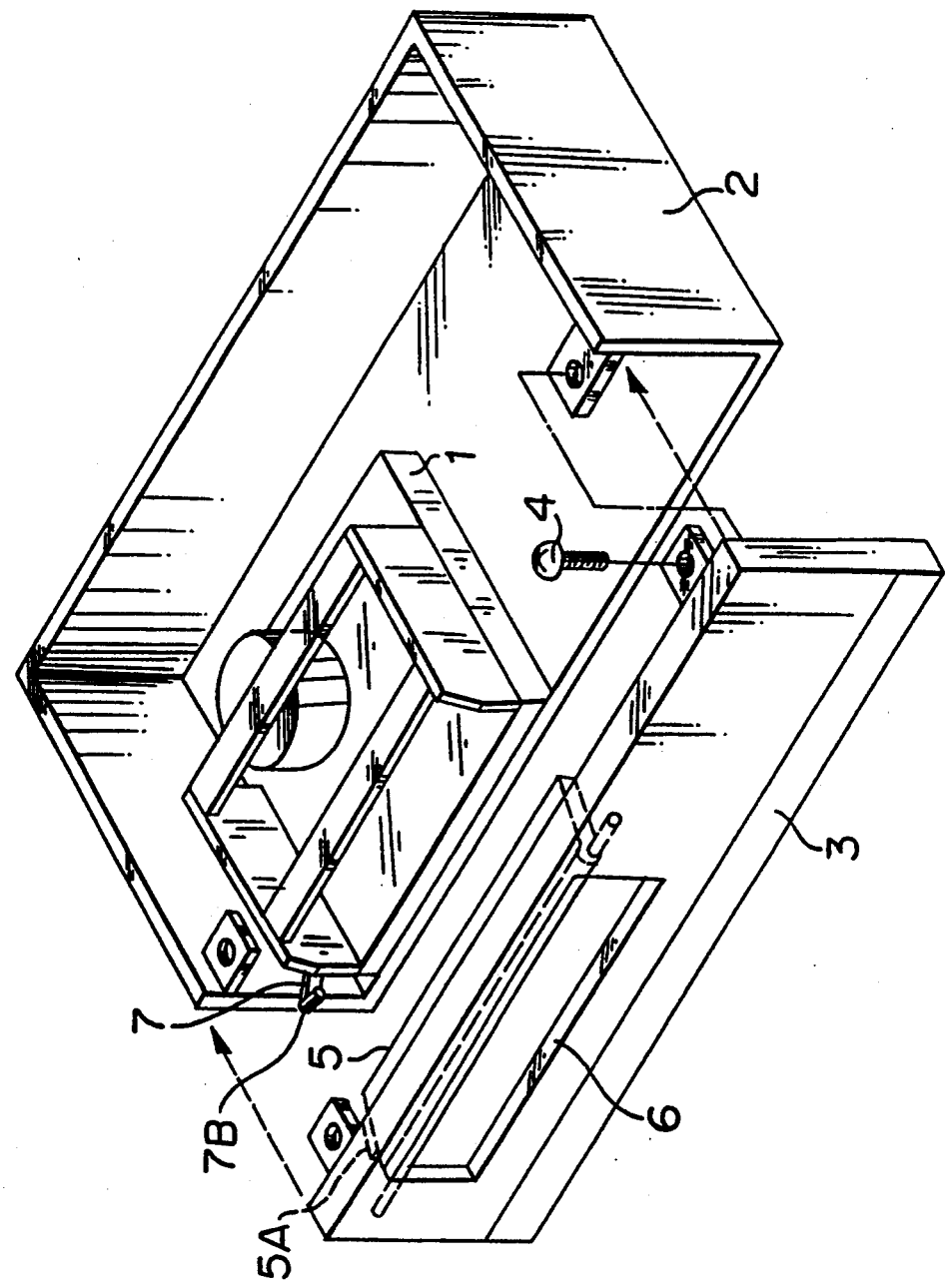
FIG. 1 is a front perspective view of a tape or disc recorder to which a device for manipulating a shutter is generally adapted, the shutter being attached to a front panel so as to close an opening which is formed in the front panel as a cassette inlet and outlet.
Figure 2:
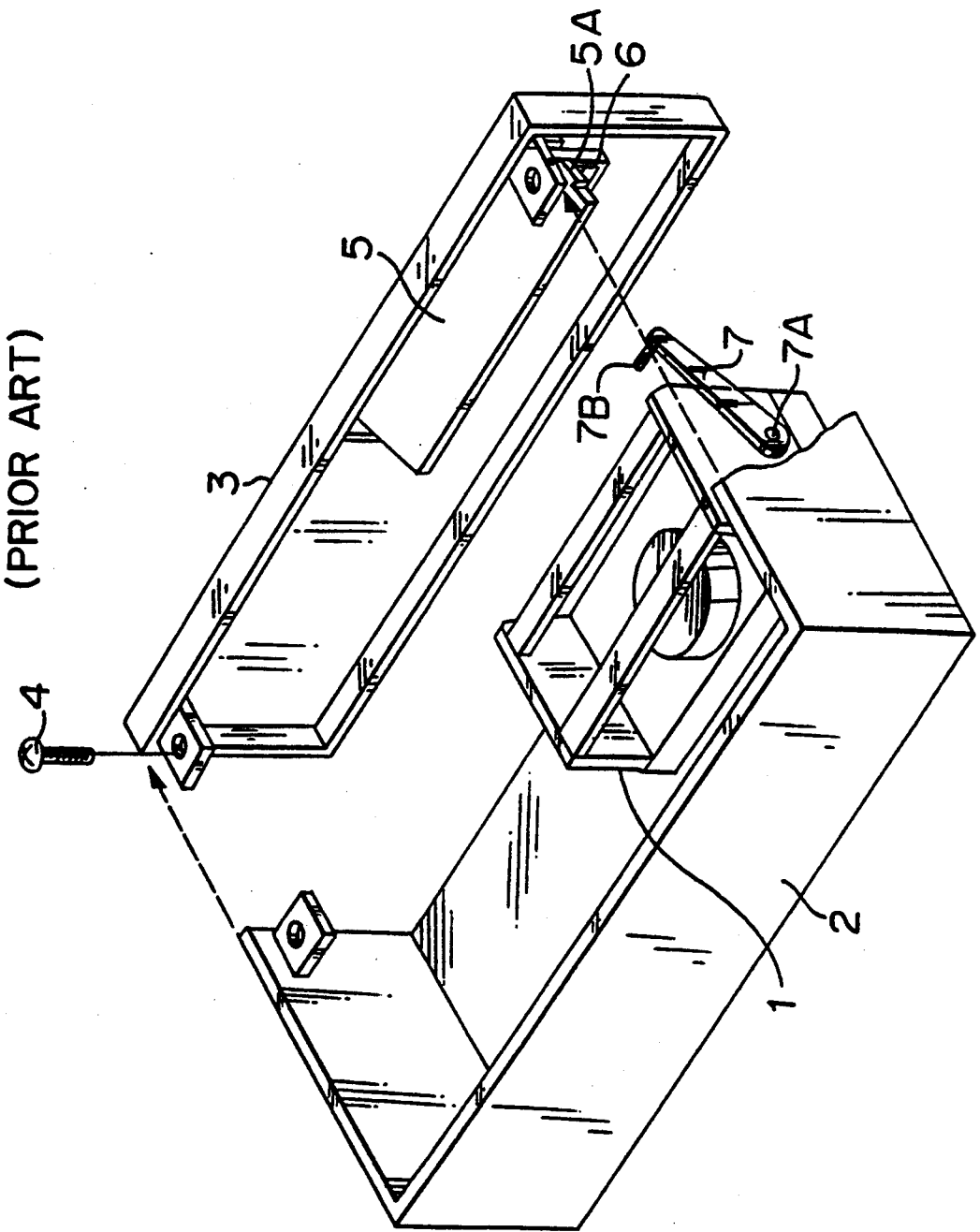
FIG. 2 is a rear perspective view of the tape or disc recorder shown in FIG. 1.
Figure 3:
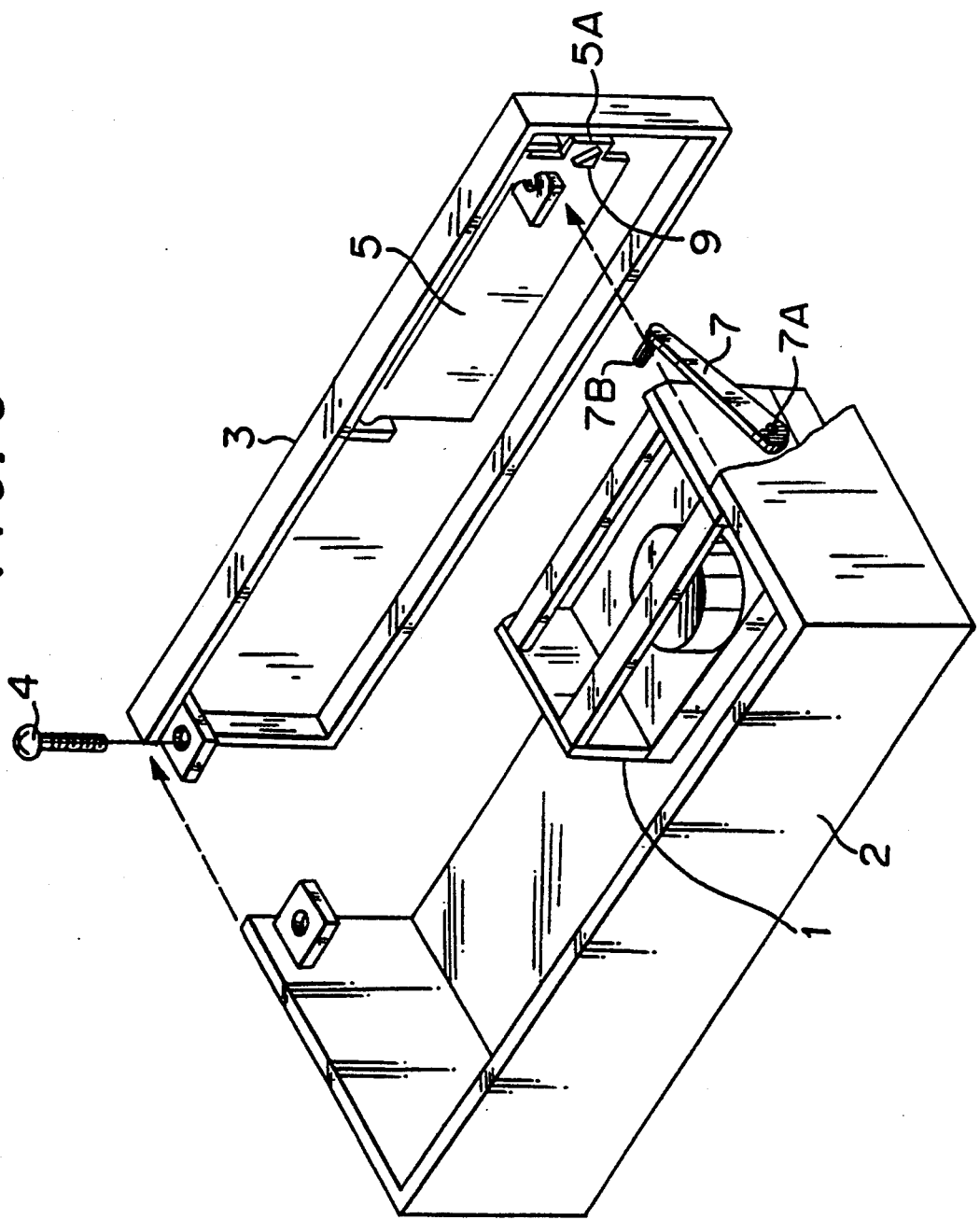
FIG. 3 is a rear perspective view of a device for manipulating a shutter according to the present invention, which is partially broken away on one side so as to illustrate the swinging lever.
Figure 4A:
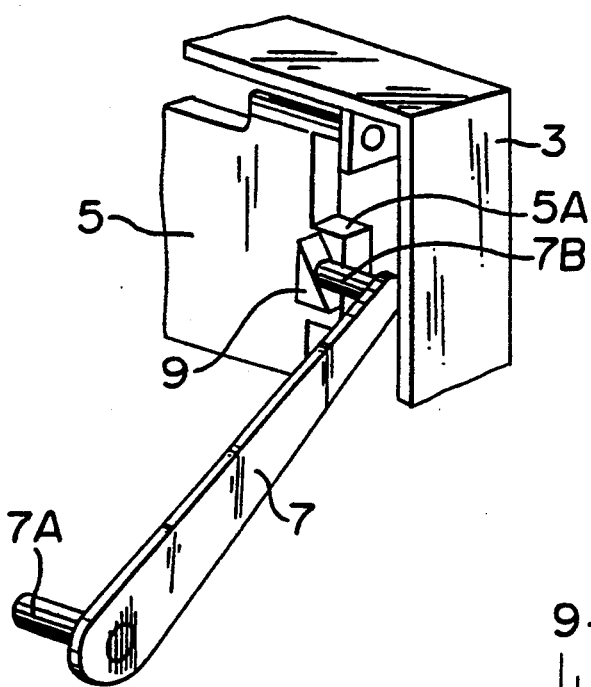
FIGS. 4(a), 4(b), 4(c), 5 and 6 are perspective views of various manipulating device made according to the present invention.
Figure 4B:
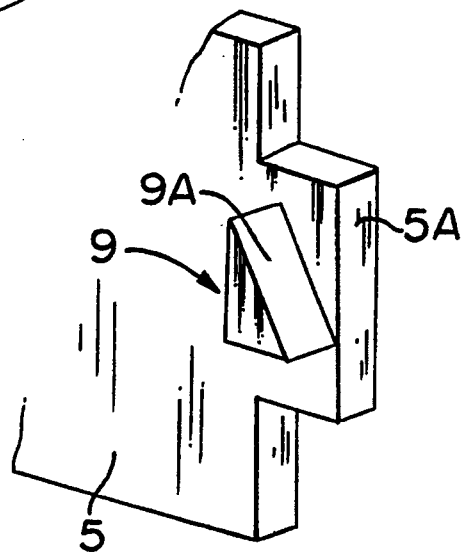
Figure 4C:
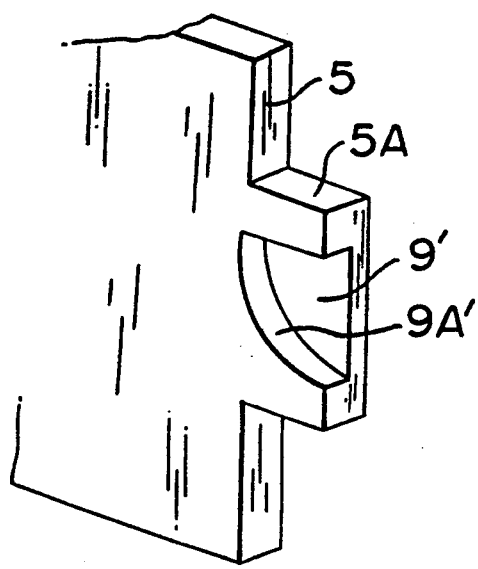
Figure 5:
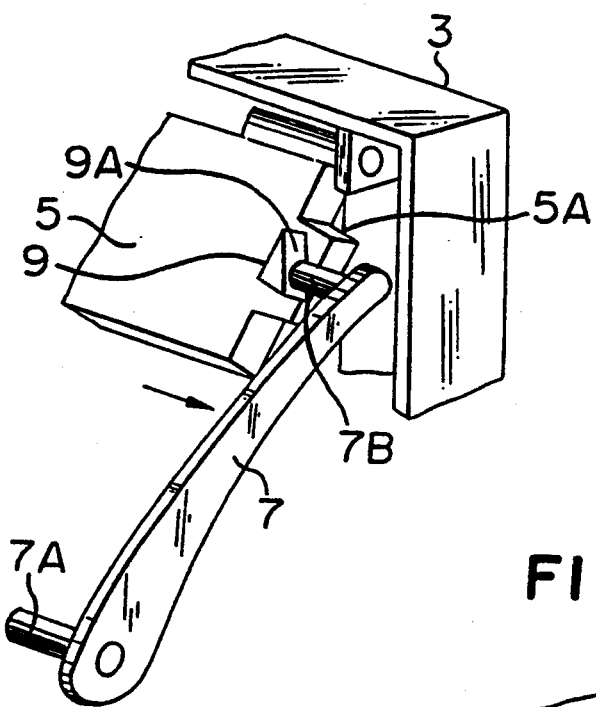
Figure 6:
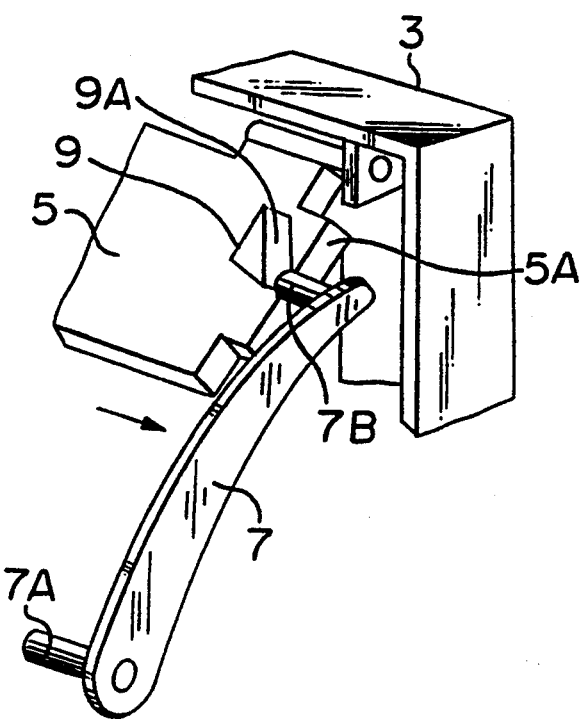
Figure 7:
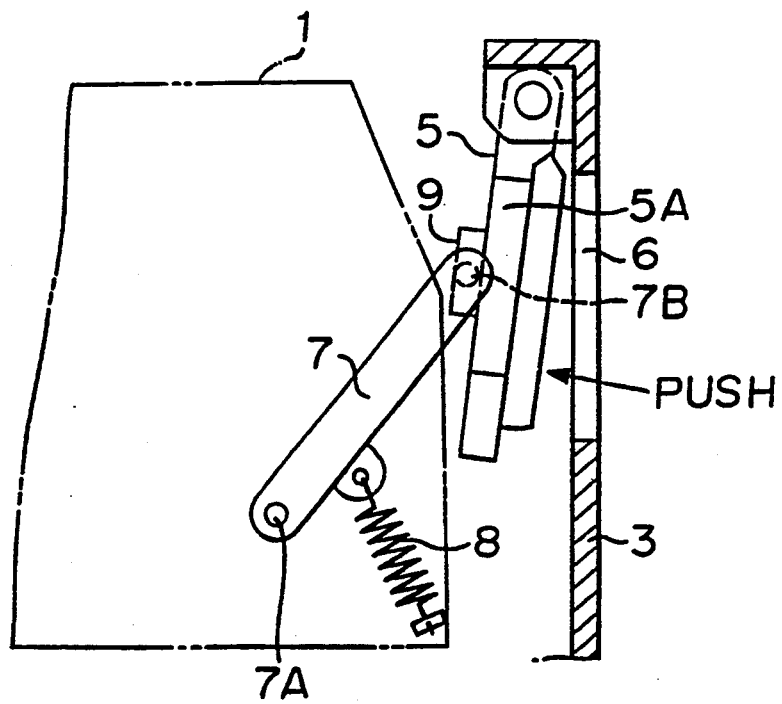
FIG. 7 is a side view of the embodiment mentioned above in such condition that the front panel is not assembled to the recorder chassis.
Figure 8:
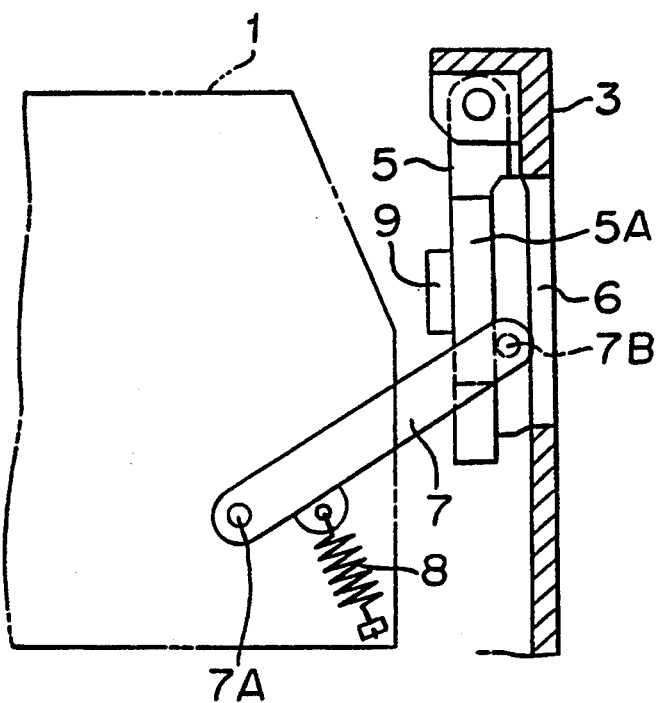
FIG. 8 is a side view of the embodiment mentioned above in such condition that the front panel is already assembled to the chassis.

In order to avoid an unnecessary explanation, the same members as included in the shutter-manipulating device mentioned in FIGS. 1 and 2 are illustrated by the identical reference numbers in the other drawings indicating various embodiments of the present invention.

The shutter-manipulating device according to the present invention is generally provided with a shutter 5 with a stump 5A integrally formed to the side thereof, a swinging lever 7 which has a pivot shaft 7B attached to its base end so as to be pivotally supported to the side of the chassis, and a guide pin 7B is formed at its free end so as to be engaged to the stump 5A, but is particularly provided with a deflector 9 disposed at the rear side of the stump 5A, and the swinging lever 7 is made deflectable or flexible so as to cause the guide pin 7B to be directed to the outside by the side of the stump by the guide of the deflector 9.

In the first embodiment illustrated in FIGS. 3 to 8, the deflector 9 comprises a triangle piece or ramp attached to the rear surface of the stump 5A with its guide surface 9A inclining in a vertical direction in a manner to extend to side by side of the shutter 7, and the swinging lever 7 is formed by a suitable elastic material such as a synthetic resin with its width being sized to a thin measure for directing to the side thereof.

Accordingly, the front panel 3 is secured to the front face of the chassis 2 by means of suitable threaded screws in the assembling operation, the shutter 5 may be pushed to the inside of the chassis 2 by means of a pusher (not shown in the drawing) which is inserted through the opening 6 automatically or by the operator's hands so as to cause the swinging lever 7 to be flexibly deflected to the outside of the deck due to the elastic quality thereof in such manner that its guide pin 7B is slidably guided along the guide surface 9A so as to slide over the side by side of the stump 5A, thereby to be settled to the front side of the stump 5A.

In this embodiment, the deflector 9 may comprise a groove 9' formed at the rear surface of the stump 5A with its guide surface 9A' inclining in a vertical direction in a manner to extend to side by side of the shutter 5, and the swinging lever 7 is formed by a suitable elastic material such as a synthetic resin with its width being sized to a thin measure so as to be directed to the side thereof.

Figure 9:
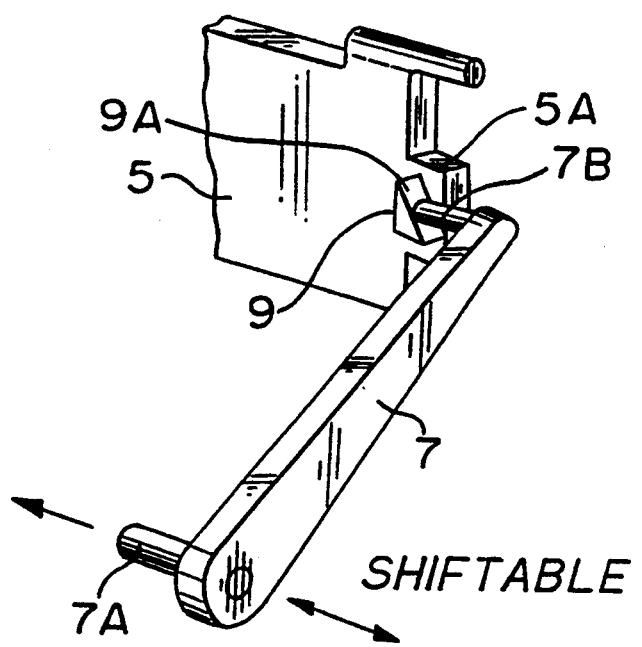
FIG. 9 is a partial perspective view of another embodiment of the present invention.
Figure 10:
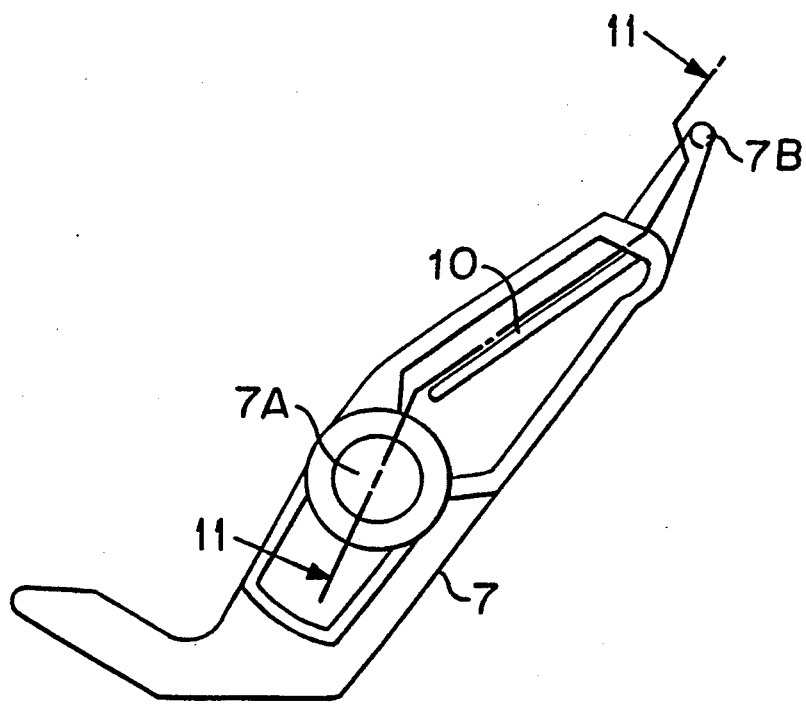
FIG. 10 is a side view of another type swinging lever modified for use in the present invention.
Figure 11:
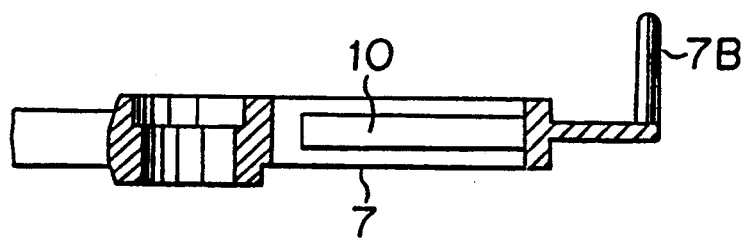
FIG. 11 is a sectional view, taken along the line 11—11 of FIG. 10.
Figure 12:
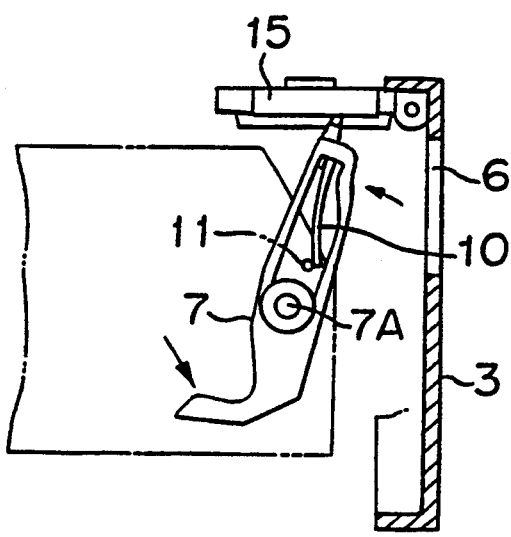
FIGS. 12 and 13 are side views of the modification shown in FIGS. 10 and 11, but illustrating the operation of the swinging lever.
Figure 13:
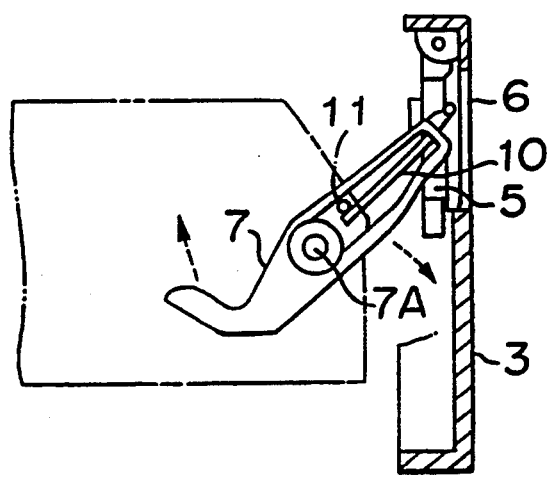

In the second embodiment illustrated in FIG. 9, the swinging lever 7 is formed into a rigid shape, and the pivot shaft 7A can be shifted to its axis direction but is biased to the same direction by means of a bias spring member (not shown in the drawing) so that when the shutter 5 is pushed to the inside of the chassis 2 in such assembling operation that the front panel 3 is attached to the chassis 2, the swinging lever 7 can be deflected against the bias spring force in a manner to guide the guide pin 7B along the guide surface 9A so as to slide over the side by side of the stump 5A, thereby to be settled to the front side of the stump 5A.

The modification of this invention includes a bias spring portion 10 intergrally formed to the swinging lever 7, which is also made of synthetic resin as shown in FIGS. 10 to 13, so that the bias spring portion is, at its free end, hooked up to a hook pin 11 attached to the inside wall of the chassis in a manner to be curved under the biased condition and to rebound under the released condition.

Accordingly, the bias spring portion is adapted to bias the swinging lever 7 thereby to allow the shutter to be shifted toward its closed position, instead of a bias spring member usually provided with the shutter manipulating means in the prior art in order to bias the swinging lever.

I claim:

1. An improved device for manipulating a shutter adapted to cover an opening through which a tape cassette or disc cassette is inserted in an electronic device or removed therefrom, which includes a chassis containing a tape or disc cassette deck, a front panel detachably secured to the front face of the chassis, a shutter disposed at an opening which is formed at the front panel in order to put in or take out a tape or disc cassette from the cassette deck, the shutter being hinged to the inner side of the front panel so as to releaseably cover the opening, and means for manipulating the shutter to the released condition under which the tape or disc cassette from the cassette deck can be taken out through the opening, wherein the improvement comprising manipulating means in the form of a biased swinging lever having a base end pivotally supported at a side of the chassis and having a free end with a guide pin engageable with an extension or stump formed at one side of the shutter, and said stump having a deflector with a guide surface at the rear side thereof, and the swinging lever being deflectable or flexible so as to cause the guide pin to be directed sideways away from the stump by the guide surface provided on the deflector; whereby said biased swinging lever is moved so as to clear said shutter when the tape or disc cassette is to be taken out or ejected from said electronic device.

2. An improved device for manipulating a shutter adapted to cover an opening through which a tape cassette or disc cassette is inserted in an electronic device or removed therefrom, which includes a chassis containing a tape or disc cassette deck, a front panel detachably secured to the front face of the chassis, a shutter disposed at an opening which is formed at the front panel in order to put in or take out a tape or disc cassette from the cassette deck, the shutter being hinged to the inner side of the front panel so as to releaseably cover the opening, and means for manipulating the shutter to the released condition under which the tape or disc cassette from the cassette deck can be taken out through the opening, wherein the improvement comprising manipulating means in the form of a biased swinging lever having a base end pivotally supported at a side of the chassis and having a free end with a guide pin engageable with an extension or stump formed at one side of the shutter, and said stump having a deflector with a guide surface disposed at the rear side thereof; said swinging lever being flexible so as to cause the guide pin to be directed sideways away from the stump by the guide surface provided on the deflector; and said deflector being in the form of a triangular block attached to the rear surface of the stump with its guide surface inclining in a vertical direction in a manner to extend to side by side with the shutter, and with the swinging lever being formed of a flexible material with its width being sized thin so as to be directed to the side thereof.

3. An improved device for manipulating a shutter adapted to cover an opening through which a tape cassette or disc cassette is inserted in an electronic device or removed therefrom, which includes a chassis containing a tape or disc cassette deck, a front panel detachably secured to the front face of the chassis, a shutter disposed at an opening which is formed at the front panel in order to put in or take out a tape or disc cassette from the cassette deck, the shutter being hinged to the inner side of the front panel so as to releaseably cover the opening, and means for manipulating the shutter to the released condition under which the tape or disc cassette from the cassette deck can be taken out through the opening, wherein the improvement comprising manipulating means in the form of a biased swinging lever having a base end pivotally supported at a side of the chassis and having a free end with a guide pin engageable with an extension or stump formed at one side of the shutter, and said stump having a deflector with a guide surface disposed at the rear side thereof, and the swinging lever causing the guide pin to be directed sideways away from the stump by the guide surface provided on the deflector; and said deflector being in the form of a triangular block attached to the rear surface of the stump with its guide surface inclining in a vertical direction in a manner to extend side by side with the shutter, and the swinging lever being stiff and rigid, and having a pivot shaft adapted to rotatably support the swinging lever at the base end while being shiftable along its axis direction and biased along the same axis towards the inside of the chassis.

4. The device for manipulating a shutter as claimed in claim 1, in which the deflector comprises a groove formed at the rear surface of the stump with said guide surface inclining in a vertical direction in a manner to extend to side by side with the shutter, and the swinging lever is formed of flexible material with its width being sized thin so as to be directed to the side thereof.

5. The device for manipulating a shutter as claimed in claim 1, in which the swinging lever includes a flexible portion integrally formed with the swinging lever, so that the flexible portion is, at its free end, hooked up to a hook pin attached to the inside wall of the chassis in such a manner as to be curved under a biased condition and to rebound under a released condition.

* * * * *